US012645874B1

(12) United States Patent
Deepak et al.

(10) Patent No.: US 12,645,874 B1
(45) Date of Patent: Jun. 2, 2026

(54) LLM-BASED TRANSCRIPT CORRECTION AND AUTOMATIC HIGHLIGHT GENERATOR

(71) Applicant: Morgan Stanley Services Group Inc., New York, NY (US)

(72) Inventors: Vishnu Deepak, Bangalore (IN); Prabhat Kumar, Bangalore (IN)

(73) Assignee: Morgan Stanley Services Group Inc., New York, NY (US)

( * ) Notice: Subject to any disclaimer, the term of this patent is extended or adjusted under 35 U.S.C. 154(b) by 169 days.

(21) Appl. No.: 18/755,092

(22) Filed: Jun. 26, 2024

(51) Int. Cl.
 *G06F 40/232* (2020.01)
 *G06F 40/289* (2020.01)
 *G06F 40/40* (2020.01)

(52) U.S. Cl.
 CPC .......... *G06F 40/232* (2020.01); *G06F 40/289* (2020.01); *G06F 40/40* (2020.01)

(58) Field of Classification Search
 USPC ..................................................... 704/1–504
 See application file for complete search history.

(56) References Cited

U.S. PATENT DOCUMENTS

| | | | | |
|---|---|---|---|---|
| 8,577,683 | B2 * | 11/2013 | DeWitt ................ | G11B 27/034 |
| | | | | 704/278 |
| 9,378,731 | B2 | 6/2016 | Kapralova et al. | |
| 10,204,619 | B2 | 2/2019 | Siohan et al. | |
| 10,242,664 | B2 * | 3/2019 | Paxinos .............. | G10L 15/1807 |
| 10,388,272 | B1 * | 8/2019 | Thomson ................ | G10L 15/22 |
| 10,573,312 | B1 * | 2/2020 | Thomson ................ | G10L 15/22 |
| 10,706,840 | B2 | 7/2020 | Sak et al. | |
| 10,832,679 | B2 * | 11/2020 | Szymanski ............ | G10L 15/22 |
| 11,594,221 | B2 * | 2/2023 | Thomson .............. | G10L 15/187 |
| 12,132,580 | B2 * | 10/2024 | Clegg ..................... | G06F 40/35 |

(Continued)

FOREIGN PATENT DOCUMENTS

| | | | | |
|---|---|---|---|---|
| WO | WO-2022039967 | A1 * | 2/2022 | .......... G06F 21/602 |
| WO | WO-2024086124 | A1 * | 4/2024 | .......... G06T 11/26 |
| WO | WO-2024220308 | A1 * | 10/2024 | .......... G06N 3/0475 |

*Primary Examiner* — Marcus T Riley
(74) *Attorney, Agent, or Firm* — K&L Gates LLP

(57) ABSTRACT

Systems and methods for identify errors in a transcript using an LLM. System comprises a digital front end; a backend computer system in communication with the digital front end; and a LLM in communication with the backend computer system. The LLM is configured to receive, via the digital front end: a list of words and phrases; a list of error categories; and a transcript, in a machine-readable format, for transcript correction by the LLM. The LLM is configured, via prompts: to consider a word or phrase in the transcript to possibly be in error if the word or phrase matches one error category in the list of error categories and if the word or phrase is phonetically similar to a word or phrase in the list of correct words and phrases; to assign a confidence score to each word or phrase considered to possibly be in error in the transcript; to ignore words or phrases considered possibly in error if the assigned confidence score is lower than a certain threshold value; and return a list of possible errors in the transcript in a machine-readable transcription error output format. The LLM is further configured, based on the prompts, to generate the list of possible errors in the transcript in the machine-readable transcription error output format.

20 Claims, 6 Drawing Sheets

(56)                    References Cited

U.S. PATENT DOCUMENTS

| | | | |
|---|---|---|---|
| 12,260,883 B1 * | 3/2025 | Shariff | H04N 21/4394 |
| 12,322,382 B2 * | 6/2025 | McCourt, Jr. | G10L 15/14 |
| 12,462,095 B2 * | 11/2025 | Asi | G06F 40/56 |
| 12,494,933 B2 * | 12/2025 | Clegg | G06F 40/35 |
| 12,499,874 B2 * | 12/2025 | Thomson | G10L 15/065 |
| 12,513,019 B2 * | 12/2025 | Clegg | G06F 40/35 |
| 2012/0010869 A1 * | 1/2012 | McCarley | G10L 15/26 |
| | | | 704/3 |
| 2015/0279357 A1 * | 10/2015 | Paxinos | G10L 15/1807 |
| | | | 704/235 |
| 2016/0365090 A1 | 12/2016 | Nissan | |
| 2017/0213469 A1 * | 7/2017 | Elchik | G09B 7/02 |
| 2017/0323577 A1 * | 11/2017 | Elchik | G06F 40/211 |
| 2018/0061256 A1 * | 3/2018 | Elchik | G09B 5/02 |
| 2019/0015681 A1 | 1/2019 | Pyun et al. | |
| 2020/0160866 A1 * | 5/2020 | Szymanski | G10L 15/22 |
| 2020/0175961 A1 * | 6/2020 | Thomson | G10L 15/06 |
| 2020/0175962 A1 * | 6/2020 | Thomson | G10L 15/30 |
| 2020/0404097 A1 * | 12/2020 | Engelke | H04W 4/06 |
| 2022/0059075 A1 * | 2/2022 | Thomson | G10L 15/08 |
| 2022/0059077 A1 * | 2/2022 | Thomson | G10L 15/065 |
| 2023/0014012 A1 | 1/2023 | Thedford et al. | |
| 2023/0022301 A1 | 1/2023 | McCoy et al. | |
| 2023/0028124 A1 | 1/2023 | Green | |
| 2023/0033426 A1 | 2/2023 | Sumioka | |
| 2023/0245654 A1 * | 8/2023 | Shrivastava | G10L 15/1822 |
| | | | 704/243 |
| 2024/0127513 A1 * | 4/2024 | Clegg | G06F 40/35 |
| 2024/0127514 A1 * | 4/2024 | Clegg | G06F 40/35 |
| 2024/0127798 A1 * | 4/2024 | Thomson | G10L 15/065 |
| 2024/0129148 A1 * | 4/2024 | Clegg | G06F 40/35 |

* cited by examiner

505

510

Highlights of Video

LLM-BASED TRANSCRIPT CORRECTION AND AUTOMATIC HIGHLIGHT GENERATOR

BACKGROUND

An LLM, or Large Language Model, is a type of artificial intelligence designed to understand and generate human-like text. LLMs are built using deep learning techniques, particularly using architectures like transformers. These models are trained on vast amounts of text data to learn the statistical patterns and structures of human language.

LLMs are trained on huge datasets comprising text from various sources such as books, articles, websites, and more. These data serve as the foundation for the model's understanding of language. The text data is tokenized, meaning it's broken down into smaller units such as words, subwords, or characters. Each token is assigned a numerical representation.

LLMs typically use transformer architectures, which are neural network architectures specifically designed for handling sequential data like text. Transformers consist of layers of attention mechanisms and feedforward neural networks. During training, the model learns to predict the next token in a sequence given the previous tokens. This process involves adjusting millions (or even billions) of parameters through backpropagation and optimization algorithms like stochastic gradient descent. After the initial training, LLMs can be fine-tuned on specific tasks or domains to improve performance for particular applications, such as language translation, text summarization, or question answering. Once trained, the LLM can generate text by predicting the most likely sequence of tokens given an input prompt. This process involves feeding the prompt into the model and iteratively generating tokens until a stopping condition is met.

SUMMARY

The present invention relates generally to the field of automated text processing and error correction, as well as prompt engineering of large language models (LLMs). In one general aspect, the present invention uses an LLM as a transcript correction tool. Another general aspect includes using an LLM as a highlight generation tool. Still another general aspect includes a software application, or digital tool, comprising a frontend or graphical user interface (GUI), in communication with a backend, operable to receive a transcript or other piece of text and identify errors of transcription and important regions that may be highlighted.

FIGURES

The various aspects described herein, both as to organization and methods of operation, together with further objects and advantages thereof, may best be understood by way of example with reference to the following description, taken in conjunction with the accompanying drawings as follows.

Corresponding reference characters indicate corresponding parts throughout the several views. The exemplifications set out herein illustrate various disclosed embodiments, in one form, and such exemplifications are not to be construed as limiting the scope thereof in any manner.

DESCRIPTION

In part, in one aspect, the present invention relates generally to a method for correcting mistakes in a speech-to-text transcription process. In one aspect, a speech-to-text engine may make mistakes in transcription of certain words or phrases. A speech-to-text engine may be more likely to make mistakes when transcribing proper nouns, idioms, abbreviations, language that may be unique to a certain subject matter, or other uncommon words or phrases. The present invention relates in part to a method for prompting, with a set of unique words and phrases, a large language model (LLM) to produce a machine-readable or serialized list of transcription errors identified in a transcript.

In part, in one aspect, the present invention relates to a method for identifying noteworthy or important segments or regions in a piece of text. A piece of text may include a transcript of a conversation or other spoken language. The present invention relates in part to a method for prompting an LLM to produce a machine-readable or serialized list of noteworthy or important segments or regions in a piece of text.

In another aspect, the present invention relates to a computer-based system with an application comprising a digital frontend or graphical user interface (GUI) and a backend, operable to receive a transcript or generate a transcript of spoken language and generate a list of speech-to-text errors and a list of noteworthy or important segments of text in the transcript.

Before explaining various aspects of various systems and methods disclosed herein, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

Figure 1:
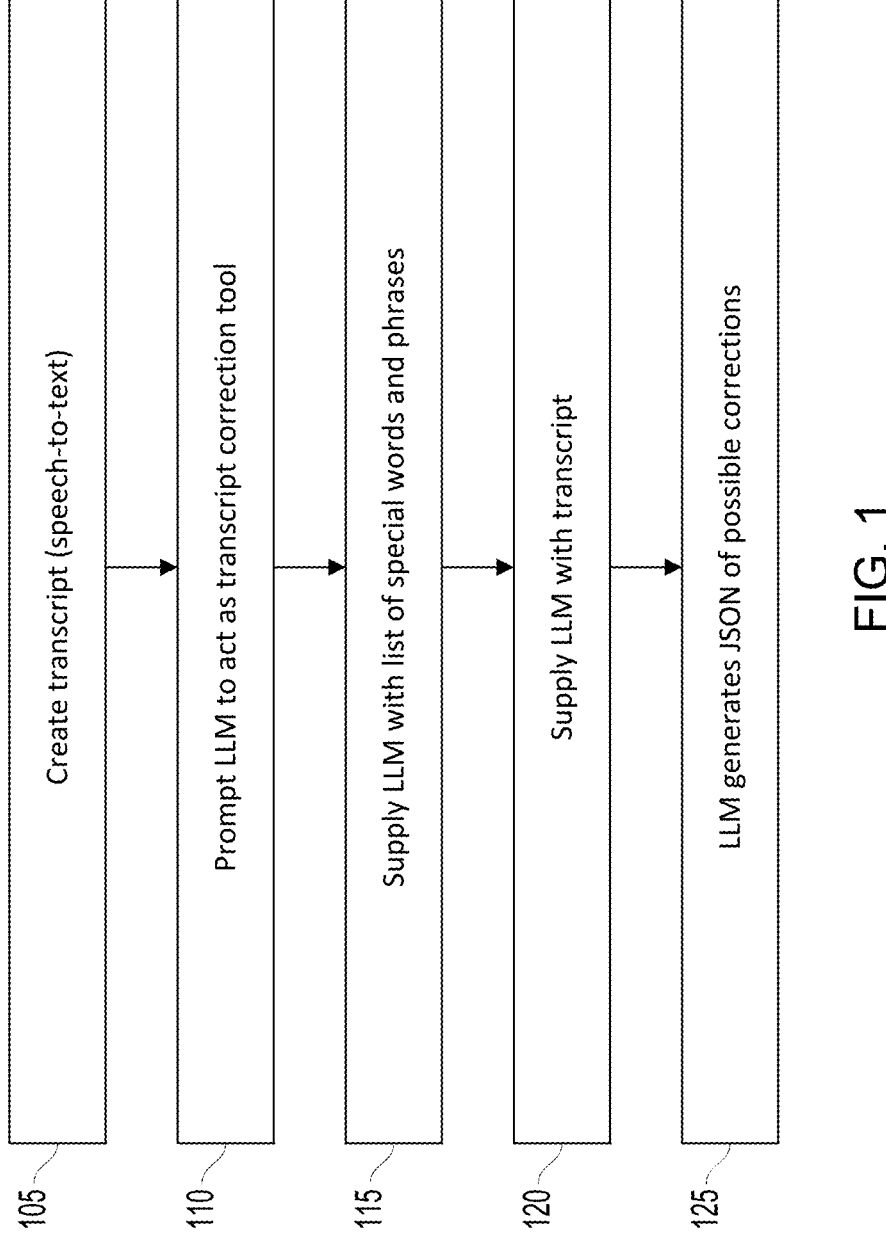
FIG. 1 is a flow chart of a method of correcting speech-to-text mistakes in transcription of uncommon or institution-specific words and phrases using a large language model (LLM), according to an exemplary embodiment of the disclosure.

Refer now to FIG. 1 where a flowchart of a method for identifying errors in a transcript of spoken language using an LLM is shown. In a first step 105, a user generates a transcript with a speech-to-text engine or other transcription mechanism of an audio recording of spoken language. The transcription might be an audio recording or video recording of such things as conversations, interviews, lectures, speeches, podcasts, phone calls, legal proceedings, meetings, conferences, presentations, webinars, documentaries, films, medical related recordings (e.g., patient consultations, medical dictations, surgery recordings, etc.), voicemails, dictations, etc. The audio and/or video recording can be recorded in any suitable digital format, such as audio files (e.g., MP3, WAV, AIFF, FLAC), video files (MP4, AVI, MOV, MKV), online meetings/calls (e.g., Zoom, Skype, Teams, Google Meet, etc.), speech-to-text transcriptions generated by dictation software, etc.

A speech-to-text engine or other transcription mechanism may be prone to introduce various errors of transcription, especially when transcribing proper nouns such as names of people, places, or products, idioms, abbreviations or acronyms, domain-specific language, or other uncommon words or phrases. For example, without specific context a transcription mechanism may mis-transcribe a name "Allen Lewis" as "Alan Louis," or vice versa, as these names are phonetically similar. Furthermore, in many embodiments, a transcription mechanism may misidentify a name as another part of speech or sentence fragment. For example, a speech-to-text engine or other transcription mechanism may mis-transcribe a name "Alice Parker" as "Alice parked her." In many embodiments, various other errors of transcription may occur during a transcription process of a speech-to-text engine or other transcription mechanism. For example, the transcription errors could be for similar sounding terms that have very different meanings and are used in different contexts, like "cache" and "cash," "kernel" and "colonel," etc. Also, an organization (e.g., a business, school, etc.) might use abbreviations, acronyms and/or coined terms that are uncommon.

In most embodiments of the disclosure, a large language model (LLM) may identify various errors of transcription in a transcript. In a second step 110 of the flow chart depicted in FIG. 1, an LLM is prompted to act as a transcript correction tool. A prompt to the LLM instructing the LLM to act as a transcript correction tool comprises various statements or instructions given to the LLM. The various statements comprise, for example, a first instruction to act as a transcription tool, a second instruction to score individual errors identified in a transcript, a third instruction to use a cutoff score below which an error is to be ignored, a fourth instruction to identify specific types of errors, and a fifth instruction to enumerate identified errors in a particular output format. In many embodiments, the first instruction, the second instruction, and the third instruction may be phrased or expressed in various ways, though a complete example prompt is given later in this section. The first instruction, for example, may be simply "You are to act as a transcript correction tool." The second instruction may be, for example "The most important metric is 'confidence score' which will be in the range 0-100 and indicates the degree of confidence in any suggestions you provide." The third instruction may be, for example, "You should not guess any corrections and must return results only if the confidence score for that result goes above 85." The fourth instruction to identify specific types of errors comprises, for example, asking the LLM to identify a mis-transcribed first and last name that is phonetically similar to a correct first and last name, such as "Alan Louis" and "Allen Lewis." The fourth instruction may further comprise asking the LLM to identify errors of transcription when only a first name is mis-transcribed, such as an erroneous transcription "Alan Lewis" when a correct name is "Allen Lewis," or errors of transcription when only a last name is mis-transcribed, such as an erroneous transcription "Allen Louis" when a correct name is "Allen Lewis." The fourth instruction may further comprise asking the LLM to identify errors of transcription such as when a first and a last name is mis-identified as a set of other words, for example an erroneous transcription "raw bird parked her" instead of "Robert Parker." The fourth instruction may further comprise asking the LLM to identify errors of transcription when only a first name is mis-transcribed as a collection of words, such as an erroneous transcription "raw bird Parker" when a correct name is "Robert Parker," or errors of transcription when only a last name is mis-transcribed as a collection of words, such as an erroneous transcription "Alice parked her" when a correct name is "Alice Parker." Finally, the fourth instruction may comprise asking the LLM to identify errors of transcription when a first name with no accompanying last name is mis-transcribed, such as an erroneous transcription "What Mickay said" when a correct name "Mickey" should be present as "What Mickey said," or errors of transcription when a last name with no accompanying first name is mis-transcribed, such as an erroneous transcription "Miss turn her" when a correct name "Turner" should be present as "Miss Turner."

In various embodiments, the fifth instruction comprises asking the LLM to produce an output comprising a list, where each item of the list contains a phrase that has been identified as mis-transcribed, a corrected phrase, a starting location of the mis-transcribed phrase, an ending location of the mis-transcribed phrase, and a score of the mis-transcribed phrase or the corrected phrase. In various embodiments of the disclosure, a transcript may contain a timestamp at each line, or sentence, or region of text, indicating an approximate time at which the line, sentence, or region occurred in the transcript, or indicating a time offset or time delta from a start of an audio recording corresponding to the transcript. Therefore, in many embodiments, an output format as described to the LLM in the fifth instruction may comprise a timestamp as a starting location and an ending location of each mis-transcribed phrase. Furthermore, in many embodiments, a requested output format may be a JSON format, a YAML format, or other machine-readable or serialized format comprising a list or array with items having fields as described.

The prompt to the LLM further comprises, as in a step 115 of the method shown in FIG. 1, supplying a list of names to the LLM. The list of names may be names that a user believes may be liable to be misidentified by a transcription mechanism, or any list of names. An example engineered prompt instructing an LLM to operate as a transcript correction tool and comprising the first, second, third, fourth, and fifth instructions as described and an example list of names likely to be mis-transcribed is given below.

[first instruction] You are to play the role of a transcript correction tool. You will function based on the rules and parameters defined below.

[second instruction] The most important metric is 'confidence score' which will be in the range 0-100 and indicates the degree of confidence in any suggestions you provide.

[thirdinstruction] You should not guess any corrections and must return results only if the confidence score for that result goes above 85.

[list of names] This is the golden list of names of people with the correct spelling which you should look out for in the transcripts provided for analysis: Allen Lewis, Robert Parker, Mickey Mantle, Alice Parker, Barbara Turner.

[fourth instruction] The following is an exhaustive list of errors which need to be identified from any input transcripts provided.

Misspellings of both first and last names, like 'Alan Louis' instead of 'Allen Lewis'; misspellings of just the last name, like 'Allen Louis' instead of 'Allen Lewis'; misspellings of just the first name, like 'Alan Lewis' instead of 'Allen Lewis'; multi-word match of both first and last names, like 'raw bird parked her' instead of 'Robert Parker'; multi-word match of just last names, like 'Alice parked her' instead of 'Alice Parker'; multi-word match of just last names, like 'raw bird Parker' instead of 'Robert Parker'; Single or multi-word first name misspellings with no accompanying last name, like 'What Mickay said' instead of 'What Mickey said'; single or multi-word last name misspellings with no accompanying first name, like 'Miss turn her' instead of 'Miss Turner'

[fifth instruction] The output should be formatted as a json array where each item contains the following strings:
a. The phrase selected for correction
b. The corrected phrase
c. The starting index of the correction
d. The ending index of the correction
e. The confidence score of the correction Referring still to the example embodiment of FIG. 1, a method for identifying errors in a transcript of spoken language using an LLM further comprises a step 120 of supplying the LLM with the transcript. The (i) list of special words and phrases at step 115 and (ii) the transcript at step 120 can be uploaded to the LLM via any suitable file upload means, such as direct upload, copy and paste, API integration, cloud storage integration, and/or email submission. The file format for the list and transcript can depend on the requirements of the LLM. For example, the file formats could be .txt, .xml, .doc, .docx, .rtf, .json or .pdf files. As described herein, the transcript of the audio and/or video recording to be transcribed can be generating by extract the audio from the native audio or video recording, and then generating a text transcription thereof, via a speech-to-text generator, from the extracted audio.

At step 125, the LLM, is prompted to generate an output containing possible corrections in the transcript in the requested format. In some embodiments, the transcript may be supplied to the LLM, sequentially, in pieces. For example, the transcript by be supplied sentence by sentence.

Figure 2:
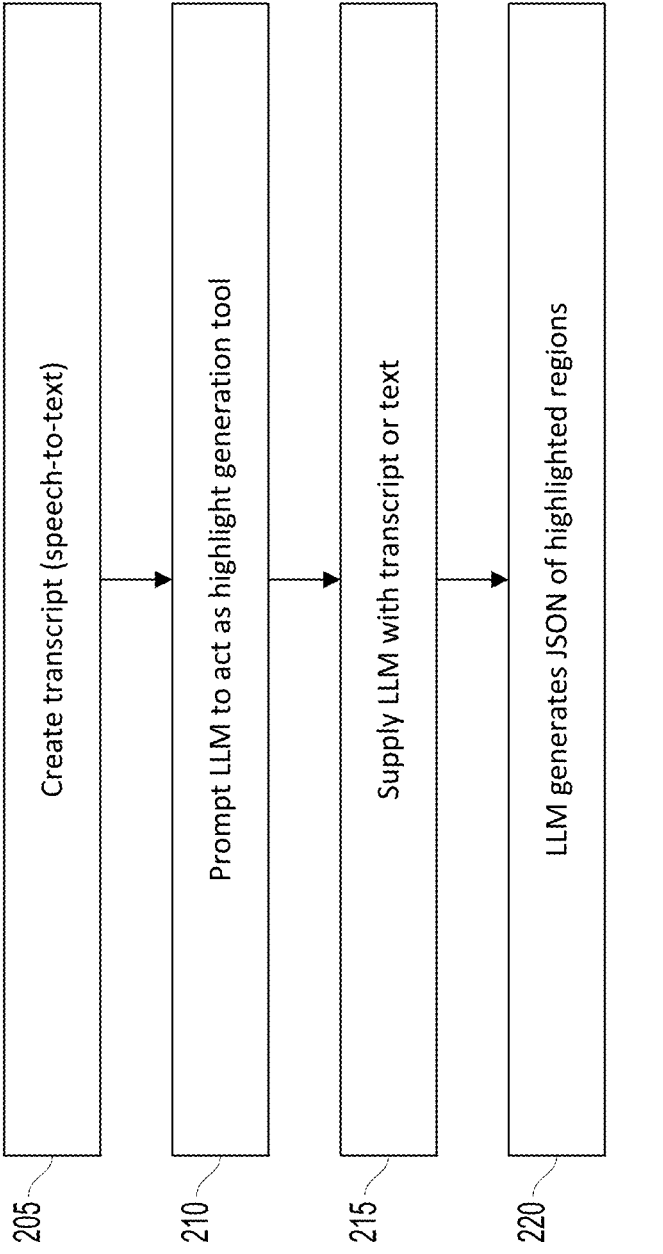
FIG. 2 is a flow chart of a method of identifying, using an LLM, regions in a piece of text that are to be highlighted, according to an exemplary embodiment of the disclosure.

Refer now to the example embodiment of FIG. 2, which depicts a flow chart of a method of identifying, using an LLM, regions in a piece of text that are to be highlighted. In a first step 205, a user generates a transcript with a speech-to-text engine or other transcription mechanism of an audio or video recording of spoken language. In some embodiments, the user may only create or choose a piece of text, not necessarily derived from an audio or video recording. In other embodiments, the transcript may have already been generated and post-processed, for example a transcript may have been corrected based on suggestions from an LLM as in the method depicted in FIG. 1.

In many embodiments, in a second step 210, the user prompts the LLM to act as a highlight generation tool for the transcript. A prompt to the LLM instructing the LLM to act as a highlight generation tool can comprise various statements or instructions given to the LLM via the user/client device (e.g., the digital front end). The various statements comprise, for example, a first instruction to act as a highlight generation tool, a second instruction to score individual phrases or sentences in a transcript or piece of text according to importance, and a third instruction to define a length limit on a highlighted phrase, sentence, or groups of sentences. A length limit may be specified as a word limit, or as a time limit. In many embodiments, a transcript may contain a timestamp at each line, or sentence, or region of text, indicating an approximate time at which the line, sentence, or region occurred in the transcript, or indicating a time offset or time delta from a start of an audio recording corresponding to the transcript. Therefore, a length limit on a highlighted region of text may be specified as a time limit in correspondence with timestamps given at each line, sentence, or region of the transcript.

The various statements or instructions instructing the LLM to act as a highlight generation tool can further comprise a fourth instruction to parse a particular input format of the transcript, where the input format may be machine-readable or serialized. In some embodiments, the input format may be a JSON array, where each element of the array is a JSON object with a field containing a text portion of the transcript, a field containing a start time of the text portion, and a field containing the end time of the text portion.

Finally, the various statements or instructions instructing the LLM to act as a highlight generation tool can further comprise a fifth instruction to produce as an output a list of sentences with a high importance score that are within the specified time limit. In some embodiments, the fifth instruction may further comprise asking the LLM to produce an output in a particular output format. In some embodiments, the output format may be the same as the input format.

An example engineered prompt instructing an LLM to operate as a highlight generation tool and comprising the first, second, third, fourth, and fifth instructions as described and an example list of names likely to be mis-transcribed is given below.

[first instruction] You are to play the role of a highlight generation tool. You will function based on the rules and parameters defined below.

[second instruction] The most important metric is 'importance score' which will be in the range 0-100 and indicates the importance of any sentence you process.

[thirdinstruction] The next important factor is time limit, for the overall video which is set as 60 seconds.

[fourth instruction] The input format consists of a json array with 3 items in each record: 'text' which contains the actual text to be processed, 'start_time' which marks the timestamp of start of the sentence, and 'end_time' which marks the end of the timestamp of the sentence spoken.

[fifth instruction] Go through every sentence provided and generate their relative importance scores based on your contextual understanding. Then, based on the importance score of each sentence and overall time limit, create a list of sentences which give the highest average score while keeping their combined duration less than the time limit. Return the filtered list in the same format as the input.

Figure 3:
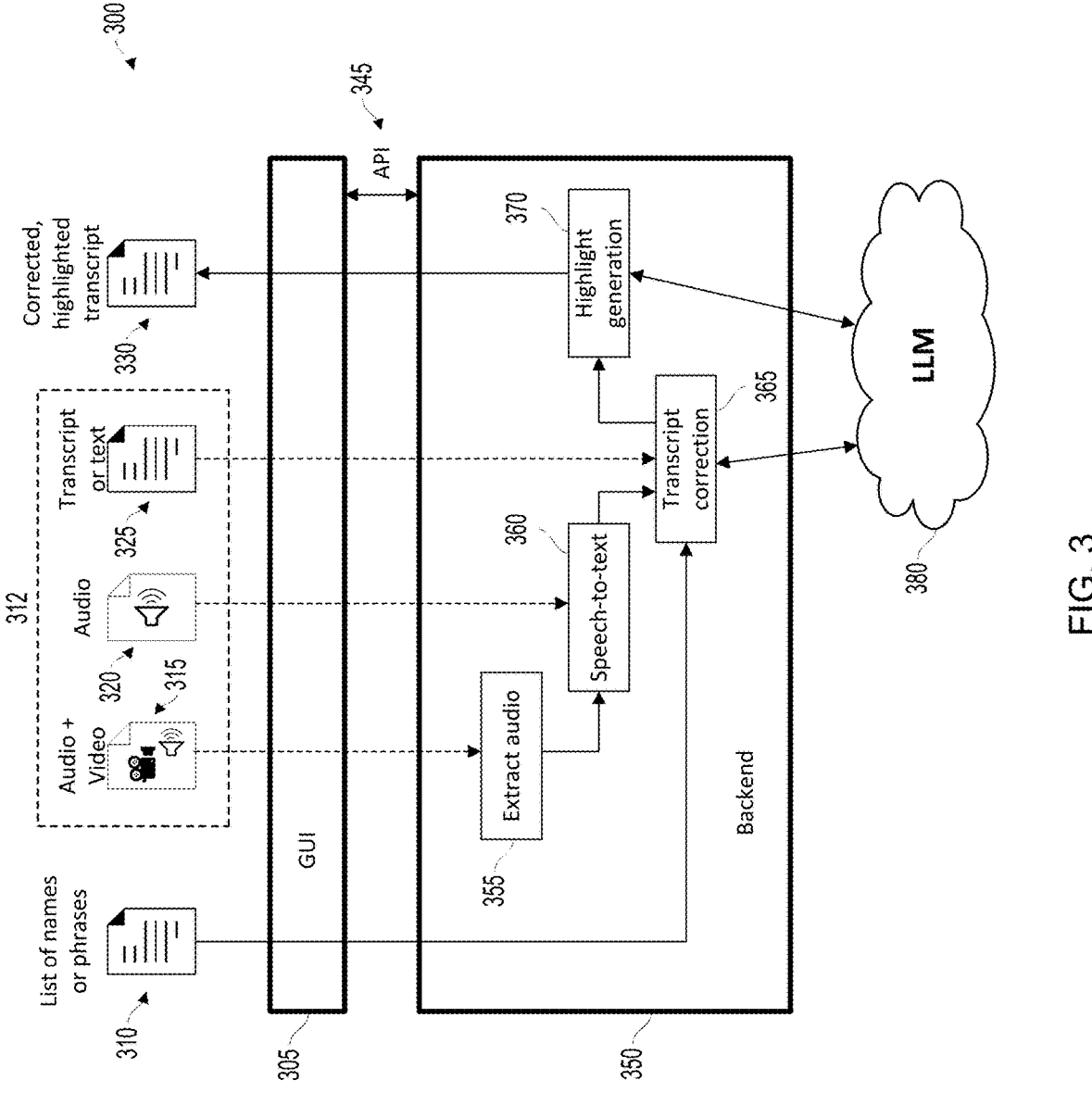
FIG. 3 is a system diagram of an application operable to interact with an LLM to correct a transcript and to generate highlights in a transcript according to an exemplary embodiment of the disclosure.

Refer now to FIG. 3, which depicts a system diagram of an application 300 operable to interact with an LLM 380 to correct a transcript and to generate highlights in a transcript. In the figure, the application comprises a graphical user interface (GUI) (e.g., a digital front end) 305 and a backend 350. The GUI 305 may be a local application on an end user/client computer device or a web-based application. In the case of a web-based application, the GUI elements can be coded using HTML, CSS, and/or JavaScript, and they can be hosted on a server (not shown). When a user accesses the application through a web browser on the client computer device, the GUI is rendered on the client device by downloading and executing code from the server.

In most embodiments, a user interacts with the GUI/ digital front end 305, and the GUI 305 interacts with the backend 350 via an application programmer interface (API) 345. In most embodiments, a user loads a list 310 of uncommon names, words, or phrases into the GUI 305, as well as one of a set 312 of possible inputs. In various embodiments, the set of possible inputs comprises a video container 315 that comprises various audio and video tracks, an audio file 320 that comprises at least one audio track, and a transcript or piece of text 325. In many embodiments, if a user loads a video container 315, the backend 350 will extract 355 an audio track and then execute a speech-to-text process to generate a transcript thereof. In one embodiment, if a user loads an audio file 320, the backend 350 will perform a speech-to-text process to generate a transcript. In most embodiments, if a user simply loads a transcript 325 in the GUI 305, or if a user loads an audio file 320 and the backend 350 extracts a transcript, or if a user loads a video container 315 and the backend 350 extracts an audio track and generates a transcript, the backend 350 will execute a transcript correction process 365 to locate and optionally correct errors in the transcript. The transcript correction process 365 uses the list 310 of uncommon names, words, or phrases, interacts with the LLM 380, and may implement the transcript correction method of FIG. 1. In many embodiments, a corrected transcript then undergoes a highlight generation process 370. The highlight generation process interacts with the LLM 380 to locate sections of the transcript to be highlighted and may implement the highlight generation method of FIG. 2. Finally, the backend 350 returns to the GUI 305 a corrected and highlighted transcript 330.

While a user may interact with the application via the GUI 305, in some embodiments of the disclosure, a user may also interact directly with the backend 350 via the API 345. A user may execute calls to the API via HTTP requests, web requests, or by another method.

In at least one embodiment, if a user loads a video container 315 into the GUI 305, the application 300 may display in the GUI 305 a version of the video where certain segments of the video are highlighted, corresponding to highlighted segments in an associated transcript.

The backend 350 may be implemented with one or a network of computers, such as servers, and may include suitable databases. The backend may use a programming language (e.g., Python, Java, Node.js) and a database system (e.g., MySQL, PostgreSQL, MongoDB), and any additional frameworks or tools needed for deployment.

Figure 4:
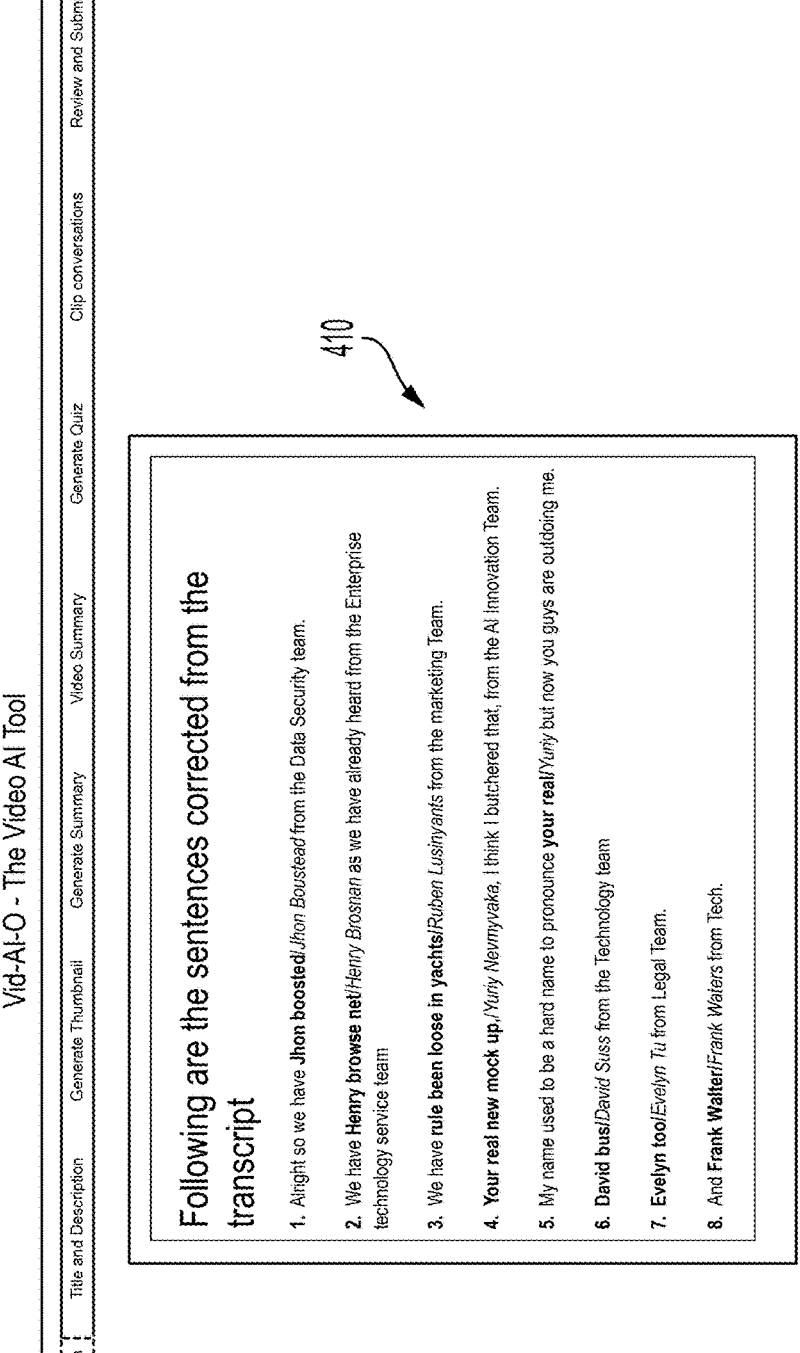
FIG. 4 is a screen capture of a graphical user interface (GUI) of an application operable to interact with an LLM to correct a transcript and to generate highlights in a transcript, where the screen capture shows a list of corrections in a transcript, according to an exemplary embodiment of the disclosure.

Refer now to FIG. 4, which depicts a screen capture of a view 405 in a graphical user interface (GUI) of an application operable to interact with an LLM to correct a transcript and to generate highlights in a transcript. In the figure, the view 405 shows a list 410 of corrections in a transcript, according to an exemplary embodiment of the disclosure.

Figure 5:
FIG. 5 is a screen capture of a graphical user interface (GUI) of an application operable to interact with an LLM to correct a transcript and to generate highlights in a transcript, where the screen capture shows a video with highlighted segments, according to an exemplary embodiment of the disclosure.
Figure 5:
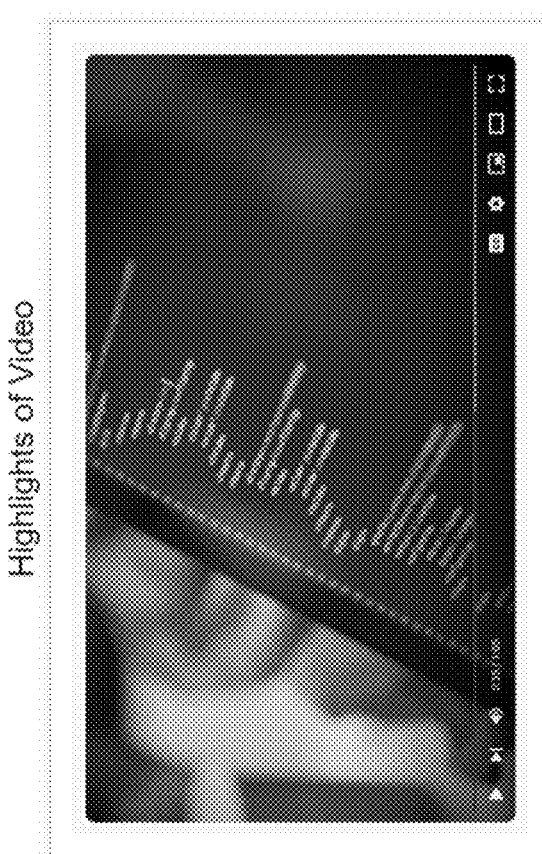

Refer now to FIG. 5, which depicts a screen capture of a view 505 in a graphical user interface (GUI) of an application operable to interact with an LLM to correct a transcript and to generate highlights in a transcript. In the figure, the view 505 shows a display 510 of a video where certain segments of the video are highlighted, corresponding to highlighted segments in an associated transcript.

Figure 6:
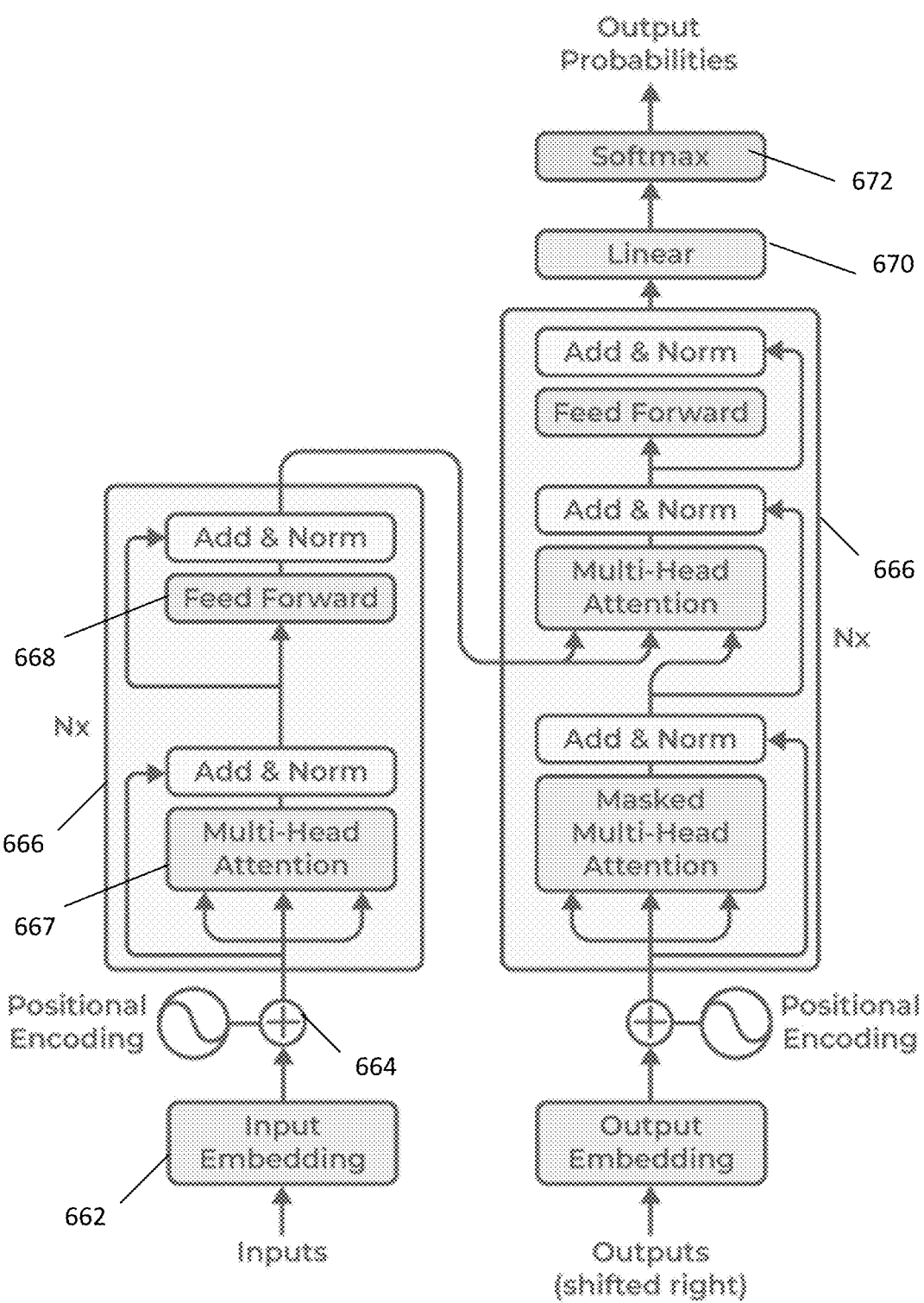
FIG. 6 is a block diagram of a transformer based LLM model, according to an exemplary embodiment of the disclosure.

The example of FIG. 6 shows a transformer based LLM model 380. At the input embedding layer 662 in FIG. 6, the end user's input prompts are tokenized into smaller units, such as words or sub-words, and each token is embedded into a continuous vector representation. This embedding step captures the semantic and syntactic information of the input in a high-dimensional space. Positional encoding is added at block 664 to the input embeddings to provide information about the positions of the tokens because transformers do not naturally encode the order of the tokens. This enables the model to process the tokens while taking their sequential order into account.

Based on a neural network technique, an encoder analyzes the input text and creates a number of hidden states that protect the context and meaning of text data. Multiple encoder layers 666 make up the core of the transformer architecture. Self-attention mechanism and feed-forward neural network are the two fundamental sub-components of each encoder layer. The self-attention layer 667 enables the model to weigh the importance of different tokens in the input sequence by computing attention scores. It allows the model to consider the dependencies and relationships between different tokens in a context-aware manner.

After the self-attention step, a feed-forward neural network 668 is applied to each token independently. This network can include fully connected layers with non-linear activation functions, allowing the model to capture complex interactions between tokens. In some transformer-based models, a decoder component can be included in addition to the encoder. The decoder layers enable autoregressive generation, where the model can generate sequential outputs by attending to the previously generated tokens.

The transformer can employ multi-head attention 667, where self-attention is performed simultaneously with different learned attention weights. This allows the model to capture different types of relationships and attend to various parts of the input sequence simultaneously. Layer normalization can be applied after each sub-component or layer in the transformer architecture. Layer normalization helps stabilize the learning process and improves the model's ability to generalize across different inputs.

The output layers of the transformer model can vary depending on the specific task. For example, in language modeling, a linear projection 670 followed by SoftMax activation 672 can be used to generate the probability distribution over the next token.

The LLM 380 can leverage high-performance computing clusters or specialized hardware accelerators such as Graphics Processing Units (GPUs) or Tensor Processing Units (TPUs). CPUs can handle general-purpose computations and manage overall system operations, including data input/ output, memory management, and task scheduling. GPUs are preferably used for efficient processing of neural network computations. The LLM 380 may utilize GPU clusters or servers equipped with multiple GPUs to accelerate the training and inference processes. The parallel nature of GPUs allows them to handle the matrix multiplications and other computations involved in deep learning models, including LLMs, much faster than traditional CPUs. TPUs are specialized hardware accelerators designed by Google specifically for accelerating machine learning workloads. They are optimized for performing tensor operations, which are fundamental to deep learning models like LLMs. TPUs offer even higher performance and energy efficiency compared to GPUs for certain types of deep learning tasks, making them attractive options for large-scale LLM implementations, especially within cloud-based environments.

The LLM 380 may include significant amounts of memory (both RAM and VRAM) to store model parameters, intermediate activations, and input/output data. High-bandwidth memory (HBM) or similar technologies may be used to ensure fast access to data, minimizing processing bottlenecks. Large datasets for training the LLM 380 can be stored in high-capacity storage systems, such as solid-state drives (SSDs) or network-attached storage (NAS) solutions. In distributed setups, where the LLM 380 is distributed across multiple nodes or GPUs, high-speed networking infrastructure can be used for efficient communication and synchronization between nodes, such as InfiniBand or high-speed Ethernet, for interconnecting nodes in distributed clusters.

In one general aspect, therefore, the present invention is directed to systems and methods for identifying errors in a transcript using an LLM. In one embodiment, the system comprises a digital front end; a backend computer system in communication with the digital front end; and a LLM in communication with the backend computer system. The LLM is configured to receive, via the digital front end: a list of words and phrases; a list of error categories; and a transcript, in a machine-readable format, for transcript correction by the LLM. The LLM is configured, via prompts: to consider a word or phrase in the transcript to possibly be in error if the word or phrase matches one error category in the list of error categories and if the word or phrase is phonetically similar to a word or phrase in the list of correct words and phrases; to assign a confidence score to each word or phrase considered to possibly be in error in the transcript; to ignore words or phrases considered possibly in error if the assigned confidence score is lower than a certain threshold value; and return a list of possible errors in the transcript in a machine-readable transcription error output format. The LLM is further configured, based on the prompts, to generate the list of possible errors in the transcript in the machine-readable transcription error output format. The digital front end is configured to receive from the LLM the list of possible errors in the machine-readable transcription error output format. The LLM is further configured, via a prompt, to: act as a highlight generation tool with respect to the transcript; assign an importance score to each sentence in the transcript; highlight a sentence if the sentence has a relatively high ratio of an importance score of the sentence to a length of the sentence; produce a highlighted output in a machine-readable highlighted output format, the highlighted output comprising a plurality of important sentences in the transcript; and generate the highlighted output in the machine-readable highlighted output format. The digital front end is configured to receive from the LLM the highlighted output in the machine readable highlighted format.

In one embodiment, a method according to the present invention can comprise the steps of: supplying, via a digital front end, the LLM with a list of correct words and phrases; supplying, via the digital front end, the LLM with a list of error categories; supplying, via the digital front end, the LLM with a transcript, in a machine-readable format, for transcript correction by the LLM; prompting, via the digital front end, the LLM to consider a word or phrase in the transcript to possibly be in error if the word or phrase matches one error category in the list of error categories and if the word or phrase is phonetically similar to a word or phrase in the list of correct words and phrases; prompting, via the digital front end, the LLM to assign a confidence score to each word or phrase considered to possibly be in error in the transcript; prompting, via the digital front end, the LLM to ignore words or phrases considered possibly in error if the assigned confidence score is lower than a certain threshold value; prompting, via the digital front end, the LLM to return a list of possible errors in the transcript in a machine-readable output format; based on the promptings, generating by the LLM the list of possible errors in the transcript in the machine-readable output format; and receiving, by the digital front end, the list of possible errors in the machine-readable output format from the LLM.

In various implementations, the machine-readable output format comprises a JSON format.

In various implementations, the machine-readable output format comprises an array, where each element of the array comprises a phrase in the transcript marked for correction, a suggested phrase to replace the phrase marked for correction, a location in the transcript of the phrase marked for correction, and a confidence score of the suggested phrase to replace the phrase marked for correction.

In various implementations, the transcript comprises a timestamp at each line or at each sentence of text in the transcript.

In various implementations, the list of correct words and phrases comprises a list of names of persons, places, or products.

In various implementations, a user loads as input an audio file, and the transcript is generated from the audio file by the speech-to-text engine.

In various implementations, a user loads as input a video container file, where an audio track is extracted from the video container file, and where the transcript is generated from the extracted audio track by the speech-to-text engine.

In various implementations, the video is displayed in the GUI adjacent to the transcript with corrected errors and highlighted sentences.

In another general respect, the present invention is directed to a method of identifying important regions in a piece of text using a large language model (LLM), comprising the steps of: supplying, via a digital front end, the piece of text, in a machine readable format, to the LLM for the LLM to act as a highlight generation tool with respect to the piece of text; prompting, via the digital front end, the LLM to assign an importance score to each sentence in the piece of text; prompting, via the digital front end, the LLM to highlight a sentence if the sentence has a relatively high ratio of an importance score of the sentence to a length of the sentence; prompting, via the digital front end, the LLM to produce an output in a machine-readable output format, the output comprising a plurality of important sentences in the piece of text; based on the prompting, generating, by the LLM, the output in the machine-readable output format; and receiving, by the digital front end, the output from the LLM in the machine-readable output format.

In various implementations, the piece of text is a transcript of spoken language. In various implementations, the transcript comprises a timestamp at each line or at each sentence of text in the transcript. In various implementations, the machine-readable output format comprises an array, where each element of the array comprises a segment of text, a start time, an end time, and an indication that a particular segment is highlighted. In various implementations, the machine-readable output format is a JSON format.

In another general aspect, the present invention is directed to a method of identifying errors in a transcript using a large language model (LLM) and of identifying important regions in a transcript using the LLM. The method can comprise the steps of: supplying, via a digital front end, the LLM with a list of correct words and phrases; supplying, via the digital front end, the LLM with a list of error categories; supplying, via the digital front end, the LLM with a transcript, in a machine-readable format, for transcript correction by the LLM and for highlight generation by the LLM; prompting, via the digital front end, the LLM to consider a word or phrase in the transcript to possibly be in error if the word or phrase matches one error category in the list of error categories and if the word or phrase is phonetically similar to a word or phrase in the list of correct words and phrases; prompting, via the digital front end, the LLM to assign a confidence score to each word or phrase considered to possibly be in error in the transcript; prompting, via the digital front end, the LLM to ignore words or phrases considered possibly in error if the assigned confidence score is lower than a certain threshold value; prompting, via the digital front end, the LLM to return a list of possible errors in the transcript in a machine-readable transcription error output format; based on the promptings, generating by the LLM the list of possible errors in the transcript in the machine-readable transcription error output format; receiving, by the digital front end, the list of possible errors in the machine-readable transcription error output format from the LLM; prompting, via the digital front end, the LLM to assign an importance score to each sentence in the piece of text; prompting, via the digital front end, the LLM to highlight a sentence if the sentence has a relatively high ratio of an importance score of the sentence to a length of the sentence; prompting, via the digital front end, the LLM to produce a highlighted output in a machine-readable highlighted output format, the highlighted output comprising a plurality of important sentences in the transcript; based on the prompting, generating, by the LLM, the output in the machine-readable highlighted output format; and receiving, by the digital front end, the output from the LLM in the machine-readable highlighted output format.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those examples may occur to persons skilled in the art with attainment of at least some of the advantages. The disclosed examples are therefore intended to include all such modifications, alterations, and adaptations without departing from the scope of the embodiments as set forth herein.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some further descriptions of terms used herein are provided below.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

An HTTP request or web request may be transmitted in a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

As used herein, the term "backend" may be executed on a "server," which may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices may constitute a "system".

Reference to "a server" or "a processor," as used herein, may refer to a previously recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "user" may include an individual. In some embodiments or aspects, a user may be associated with one or more personal accounts and/or mobile devices.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," "an embodiment", "one embodiment," and the like means that a particular feature, structure, or characteristic described in connection with the aspect is included in at least one aspect.

Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method of identifying errors in a transcript using a large language model (LLM), the method comprising:
   supplying, via a digital front end, the LLM with a list of correct words and phrases;
   supplying, via the digital front end, the LLM with a list of error categories;
   supplying, via the digital front end, the LLM with a transcript, in a machine-readable format, for transcript correction by the LLM, wherein the LLM is configured to operate as a post-processing layer that evaluates correctness of words and phrases in the transcript to identify transcription errors in the transcript based on the transcript, the list of correct words and phrases, and the list of error categories;
   prompting, via the digital front end, the LLM to identify one or more words or phrases in the transcript as incorrectly transcribed based on (i) the transcript, (ii) the list of correct words and phrases, and (iii) the list of error categories, including determining phonetic similarity between a word or phrase and the word or phrase in the list of correct words and phrases;
   prompting, via the digital front end, the LLM to assign a confidence score to each word or phrase identified as incorrectly transcribed, the confidence score representing a likelihood that the word or phrase is incorrectly transcribed;
   prompting, via the digital front end, the LLM to ignore the words or phrases identified as incorrectly transcribed if the confidence score is lower than a certain threshold value;
   prompting, via the digital front end, the LLM to return a list of possible errors in the transcript in a machine-readable output format;
   based on the promptings, generating by the LLM the list of possible errors in the transcript in the machine-readable output format; and
   receiving, by the digital front end, the list of possible errors in the machine-readable output format from the LLM.

2. The method of claim 1, wherein the machine-readable output format comprises a JSON format.

3. The method of claim 1, wherein the machine-readable output format comprises an array, wherein each element of the array comprises a phrase in the transcript marked for correction, a suggested phrase to replace the phrase marked for correction, a location in the transcript of the phrase marked for correction, and a confidence score of the suggested phrase to replace the phrase marked for correction.

4. The method of claim 1, wherein the transcript comprises a timestamp at each line or at each sentence of text in the transcript.

5. The method of claim 1, wherein the list of correct words and phrases comprises a list of names of persons, places, or products.

6. A method of identifying important regions in a piece of text using a large language model (LLM), the method comprising:

supplying, via a digital front end, the piece of text, in a machine readable format, to the LLM, wherein the LLM is configured to evaluate contextual understanding of sentences in the piece of text to identify important regions in the piece of text;

prompting, via the digital front end, the LLM to assign an importance score to each sentence in the piece of text based on the contextual understanding of a sentence in the context of the piece of text;

prompting, via the digital front end, the LLM to select the sentence as an important sentence if the sentence has a relatively high ratio of an importance score of the sentence to a length of the sentence;

prompting, via the digital front end, the LLM to produce an output in a machine-readable output format, the output comprising a plurality of important sentences in the piece of text;

based on the prompting, generating, by the LLM, the output in the machine-readable output format; and receiving, by the digital front end, the output from the LLM in the machine-readable output format.

7. The method of claim 6, wherein the piece of text is a transcript of spoken language.

8. The method of claim 7, wherein the transcript comprises a timestamp at each line or at each sentence of text in the transcript.

9. The method of claim 8, wherein the machine-readable output format comprises an array, wherein each element of the array comprises a segment of text, a start time, an end time, and an indication that a particular segment is highlighted.

10. The method of claim 6, wherein the machine-readable output format is a JSON format.

11. A method of identifying errors in a transcript using a large language model (LLM) and of identifying important regions in a transcript using the LLM, the method comprising:

supplying, via a digital front end, the LLM with a list of correct words and phrases;

supplying, via the digital front end, the LLM with a list of error categories;

supplying, via the digital front end, the LLM with a transcript, in a machine-readable format, for transcript correction by the LLM and for highlight generation by the LLM, wherein the LLM is configured to operate as a post-processing layer that evaluates correctness of words and phrases in the transcript to identify transcription errors in the transcript based on the transcript, the list of correct words and phrases, and the list of error categories, and to evaluate contextual understanding of sentences in the transcript to identify important regions in the transcript;

prompting, via the digital front end, the LLM to identify one or more words or phrases in the transcript as incorrectly transcribed based on (i) the transcript, (ii) the list of correct words and phrases, and (iii) the list of error categories, including determining phonetic similarity between a word or phrase and the word or phrase in the list of correct words and phrases;

prompting, via the digital front end, the LLM to assign a confidence score to each word or phrase identified as incorrectly transcribed, the confidence score representing a likelihood that the word or phrase is incorrectly transcribed;

prompting, via the digital front end, the LLM to ignore the words or phrases identified as incorrectly transcribed if the confidence score is lower than a certain threshold value;

prompting, via the digital front end, the LLM to return a list of possible errors in the transcript in a machine-readable transcription error output format;

based on the promptings, generating by the LLM the list of possible errors in the transcript in the machine-readable transcription error output format;

receiving, by the digital front end, the list of possible errors in the machine-readable transcription error output format from the LLM;

prompting, via the digital front end, the LLM to assign an importance score to each sentence in the transcript based on contextual understanding of the sentence in the context of the transcript;

prompting, via the digital front end, the LLM to select a sentence as an important sentence if the sentence has a relatively high ratio of the importance score of the sentence to a length of the sentence;

prompting, via the digital front end, the LLM to produce a highlighted output in a machine-readable highlighted output format, the highlighted output comprising a plurality of important sentences in the transcript;

based on the prompting, generating, by the LLM, the highlighted output in the machine-readable highlighted output format; and receiving, by the digital front end, the highlighted output from the LLM in the machine-readable highlighted output format.

12. A system comprising:

a digital front end;

a backend computer system in communication with the digital front end; and a LLM in communication with the backend computer system, wherein:

the LLM is configured to receive, via the digital front end, a list of correct words and phrases, the LLM is configured to receive, via the digital front end, a list of error categories, the LLM is configured to receive, via the digital front end, a transcript, in a machine-readable format, for transcript correction and highlight generation by the LLM, wherein the LLM is configured to operate as a post-processing layer that evaluates correctness of words and phrases in the transcript to identify transcription errors in the transcript based on the transcript, the list of correct words and phrases, and the list of error categories, and to evaluate contextual understanding of sentences in the transcript to identify important regions in the transcript, the LLM is configured, via a prompt, to identify one or more words or phrases in the transcript as incorrectly transcribed based on (i) the transcript, (ii) the list of correct words and phrases, and (iii) the list of error categories, including determining phonetic similarity between a word or phrase and the word or phrase in the list of correct words and phrases, the LLM is configured, via a prompt, to assign a confidence score to each word or phrase identified as incorrectly transcribed, the confidence score representing a likelihood that the word or phrase is incorrectly transcribed, the LLM is configured, via a prompt, to ignore words or phrases identified as incorrectly transcribed if the confidence score is lower than a certain threshold value, the LLM is configured, via a prompt, to return a list of possible errors in the transcript in a machine-readable transcription error output format, the LLM is configured, based on the prompts, to generate the list of possible errors in the transcript in the machine-readable transcription error output format, the digital front end is configured to receive from the LLM the list of possible errors in the machine-readable transcription error output format, the LLM is configured, via a prompt, to assign an importance score to each sentence in the transcript based on contextual understanding of a sentence in the context of the transcript, the LLM is configured, via a prompt, to select the sentence if the sentence has a relatively high ratio of an importance score of the sentence to a length of the sentence, the LLM is configured, via a prompt, to produce a highlighted output in a machine-readable highlighted output format, the highlighted output comprising a plurality of important sentences in the transcript, the LLM is configured, to generate the highlighted output in the machine-readable highlighted output format, and the digital front end is configured to receive from the LLM the highlighted output in the machine-readable highlighted format.

13. The system of claim 12, wherein a user loads as input an audio file, and wherein the transcript is generated from the audio file by a speech-to-text engine.

14. The system of claim 12, wherein a user loads as input a video container file, wherein an audio track is extracted from the video container file, and wherein the transcript is generated from the extracted audio track by a speech-to-text engine.

15. The system of claim 14, wherein video is displayed in a GUI adjacent to the transcript with corrected errors and highlighted sentences.

16. The method of claim 1, wherein the LLM comprises a transformer-based neural network including one or more encoder layers having a self-attention mechanism and a feed-forward neural network, the self-attention mechanism configured to evaluate relationships among tokens of the transcript.

17. The method of claim 9, further comprising prompting, via the digital front end, the LLM to select sentences as important sentences such that a combined duration of the selected sentences, as determined from start times and end times of corresponding elements of the array, does not exceed a time limit specified in the prompting.

18. The method of claim 9, further comprising displaying, via a graphical user interface of the digital front end, a video corresponding to the transcript, wherein segments of the video corresponding to elements of the array having the indication that a particular segment is highlighted are visually distinguished from other segments of the video based on start times and end times of corresponding elements.

19. The system of claim 12, wherein: the machine-readable highlighted output format comprises a JSON array wherein each element of the JSON array comprises a text field containing a portion of the transcript, a start time field, and an end time field; the LLM is configured, via a prompt, to select sentences of the transcript as the plurality of important sentences such that a combined duration of the plurality of important sentences, as determined from start time fields and end time fields of corresponding elements of the JSON array, does not exceed a time limit specified in the prompt; and the digital front end is configured to display a video corresponding to the transcript wherein segments of the video corresponding to the plurality of important sentences are visually distinguished from other segments of the video based on the start time fields and end time fields of the corresponding elements.

20. The system of claim 12, wherein the LLM is configured to receive, as the transcript for highlight generation, a version of the transcript that has been corrected based on the list of possible errors in the machine-readable transcription error output format generated by the LLM.

* * * * *